United States Patent [19]

Weber

[11] Patent Number: 5,056,907
[45] Date of Patent: Oct. 15, 1991

[54] LONGITUDINALLY ADJUSTABLE BOW FOR GLASSES

[75] Inventor: Karl Weber, Stuttgart, Fed. Rep. of Germany

[73] Assignee: Sipal, SA, Morez, France

[21] Appl. No.: 516,028

[22] Filed: May 2, 1990

[30] Foreign Application Priority Data

May 3, 1989 [DE] Fed. Rep. of Germany ... 8905575[U]

[51] Int. Cl.$^5$ .......................... G02C 5/16; G02C 5/20
[52] U.S. Cl. ...................................... 351/118; 351/113
[58] Field of Search ............... 351/111, 118, 113, 119; 2/448

[56] References Cited

U.S. PATENT DOCUMENTS 4,544,245 10/1985 Stansbury ...................... 351/118 X

FOREIGN PATENT DOCUMENTS 224688 7/1985 German Democratic Rep. ..................................... 351/118

Primary Examiner—Rodney B. Bovernick
Attorney, Agent, or Firm—Jones, Tullar & Cooper

[57] ABSTRACT

A longitudinally adjustable bow for classes having two sections. A first bow section is formed as a closed hollow section having at least one catch. The second bow section is slidably guided in the first bow section, and has a plurality of stop notches which face and engage the catch and a turned-back extension at its inner end forming a pre-stressed spring facing away from the catch, against the force of which the second bow section can be moved relative to the first bow section for disengagement of the stop notches.

9 Claims, 2 Drawing Sheets

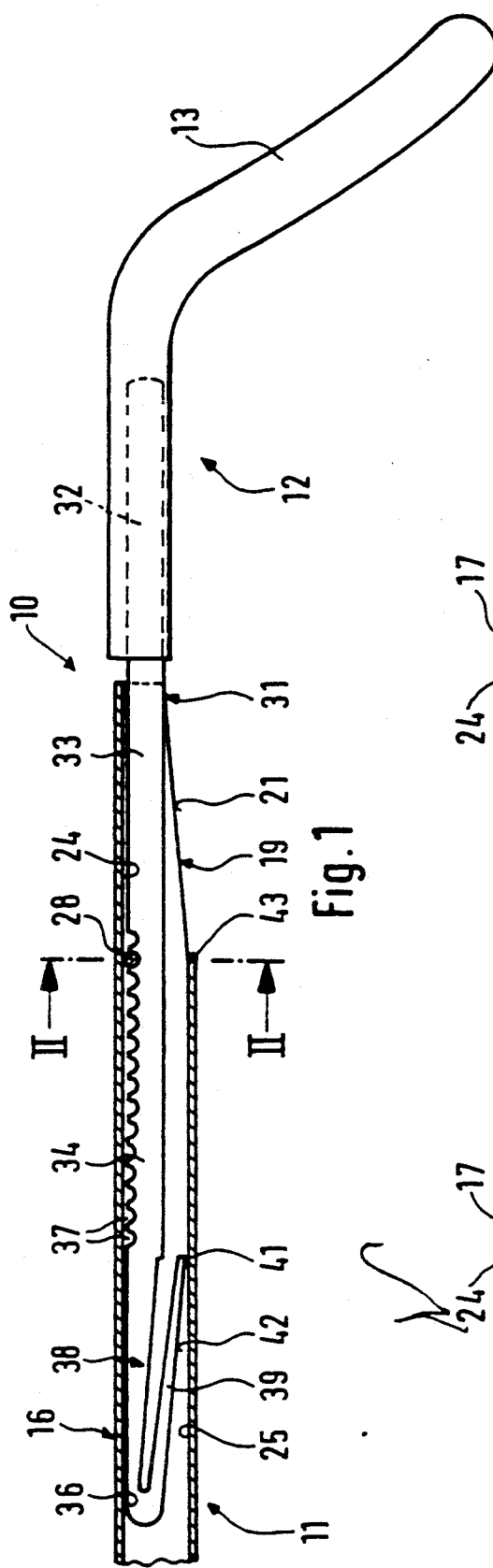
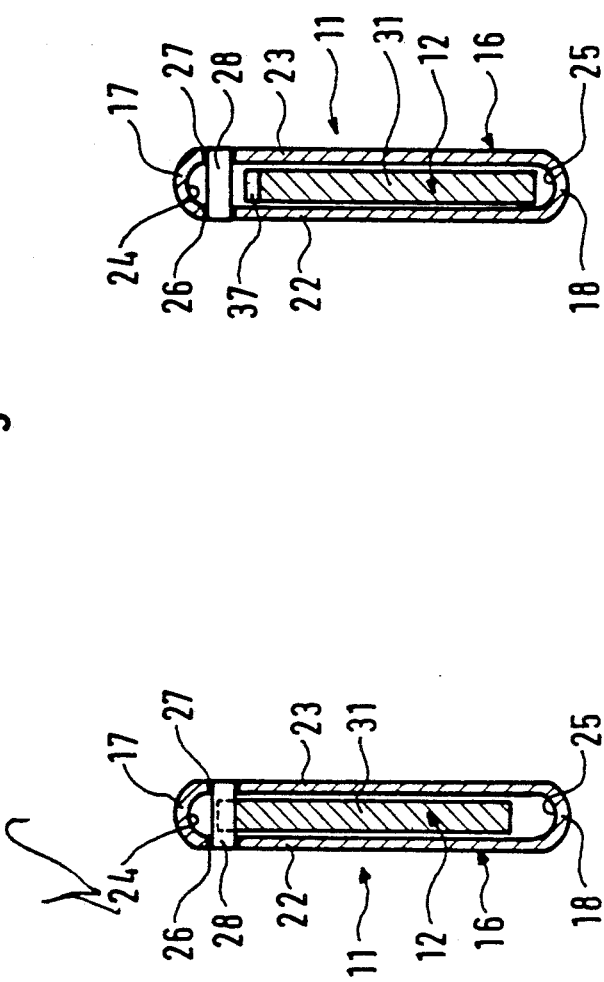

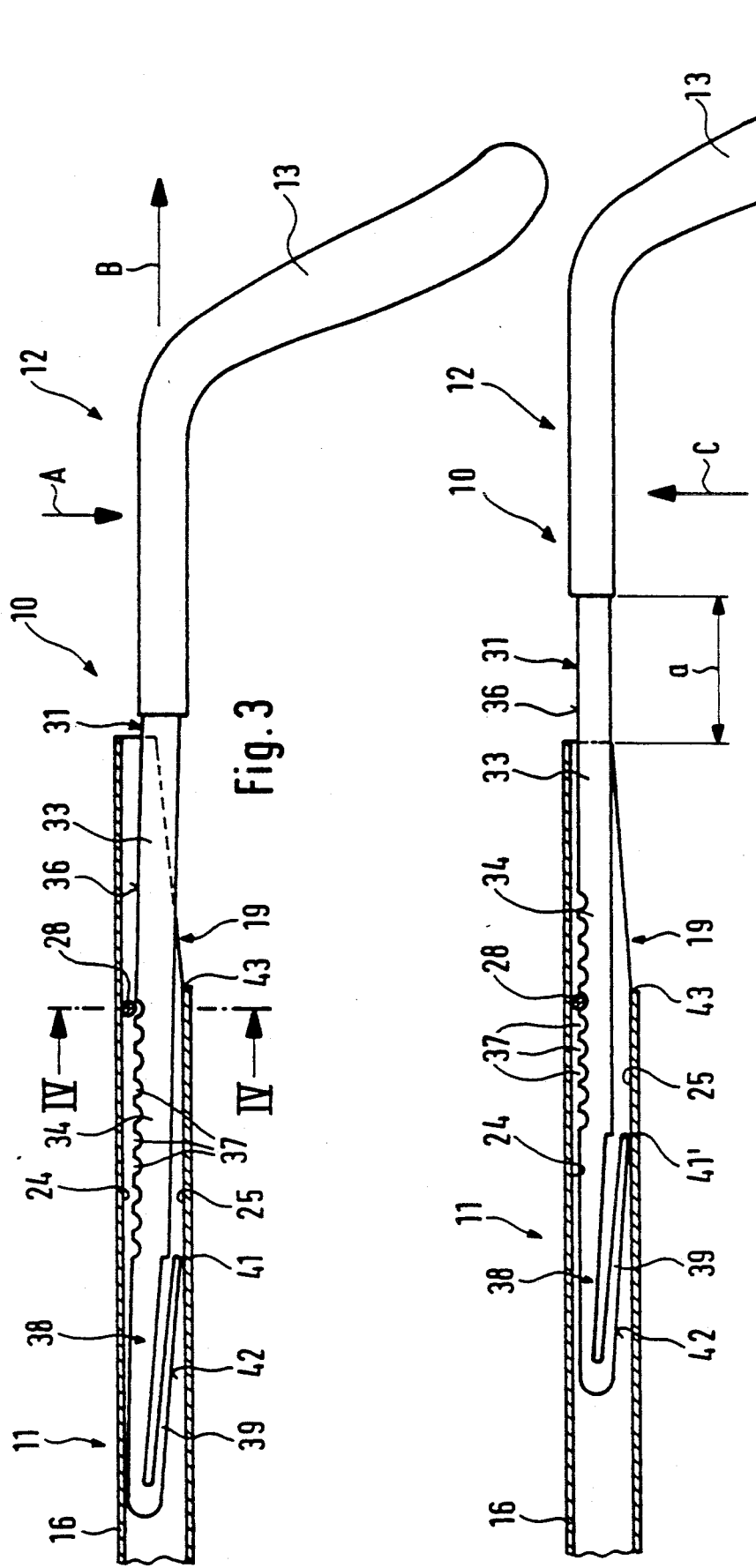

LONGITUDINALLY ADJUSTABLE BOW FOR GLASSES

BACKGROUND OF THE INVENTION

The present invention relates to a longitudinally adjustable bow for glasses with a first bow section having the shape of an essentially closed hollow section, and a second bow section slidably guided in the first bow section, and with a stop device consisting of a plurality of stop notches, at least one catch and at least one flexibly pre-stressed area.

In such a longitudinally adjustable bow, known from German Published, Examined Patent Application DE-AS 22 12 531, the catch is provided on the movable second bow section and the stop notches are disposed on the underside of the hollow section of the first bow section. By means of the flexibly pre-stressed area of the second bow section provided with the catch, the catch reaches the opposite stop notch in the first bow section. In this case the longitudinal adjustment takes place in such a way that the first bow section is held fast and pushing or pulling is performed on the second bow section in order to pull or push in this way the catch, which is seated in a stop notch, out of the latter and to push it into the next stop notch. Because such removal from a certain stop position must be performed exclusively by use of force, the danger of damage or bending of the bow sections is relatively great if it is taken into consideration that the user himself wants to make such a longitudinal adjustment. It is furthermore conceivable that with this type of forceful release of the stop device the locking power wanes with time and it is possible that the bow can shift accidentally.

A longitudinally adjustable bow operating in this way is also known from U.S. Pat. No. 4,544,245 where, although the stop notches are disposed in the movable second bow section and the catch inside the hollow section of the first bow section, the second bow section is guided without perceptible play in the first bow section. However, because the second bow section does not have a flexibly pre-stressed area, the catch and/or the stop notches themselves must be deformable on the second bow section with respect to the first bow section by the application of pull or push in order to reach another stop position. This known longitudinally adjustable bow therefore has the above mentioned disadvantages to a higher degree.

Furthermore, a longitudinally adjustable bow is known form German Utility Model DE-GM 85 07 200, the first bow section of which is made of a flat material and is provided on the outside of both parallel longitudinal edges with stop notches and on its free end with a guide eye for the second bow section. The second bow section, which also is made at least partially of a flat material is provided on its end extending over the first bow section with a slitted, sleeve-like eye which overlaps the first bow section in a pre-stressed manner in such a way that it can catch in the stop notches of the first bow section. Although the slitted, sleevelike eye can be widened from the outside with the aid of a screwdriver so as to be able to set another stop position without considerable use of force, there are nevertheless problems in regard to possible wearing off of the galvanized surface in the visible part of the first bow section. Furthermore, some skill is needed to make such an adjustment if it is desired to prevent rubbing of the second bow section on the first bow section in the course of the entire adjustment operation.

SUMMARY OF THE INVENTION

It is an object of the present invention to provide a longitudinally adjustable bow for glasses of the type mentioned above in which the adjustment can be made without considerable use of force in a simple and cost-effective way and where the danger of damage to or bending of the bow portion(s) is being avoided.

To attain this object in connection with longitudinally adjustable glasses of the type mentioned above, the first bow section has the catch extending into the hollow section and the second bow section has the stop notches, which face the catch, and in that a prestressed spring, which is supported on an area of the hollow section facing away from the catch is provided on the second bow section, against the force of which the second bow section can be moved in relation to the first bow section for disengagement of the stop device.

It is attained with the steps in accordance with the invention to disengage the respective stop position by simple and gentle pressure on the second bow section and the relative movement of the second bow section with respect to the first bow section associated therewith in a direction which extends approximately vertically to the long axis of the bow, so that for longitudinal adjustment the second bow section can be pulled or pushed in one or the other direction with respect to the first bow section in an easy manner, i.e. without the use of force. The newly set position is locked in by simply letting go of the second bow section. Because of this, neither bending nor scraping of the galvanized surfaces in the visual area are possible.

A more advantageous mechanism for adjustment and a greater adjustment range are achieved by means of the area of the second bow section which is provided with the stop notches and the area of the second bow section provided with the pre-stressed spring being separated in the axial direction. A similar case arises if the pre-stressed spring of the second bow section is provided on its inner free end area and is adjoined by the area provided with the stop notches, where simultaneously an increase in the leverage between the spring and the pressure point on the respective bow section is attained.

Advantageous embodiments in regard to the manufacture and the choice of the cross sectional dimensions of the two bow portions ensue from the pre-stressed spring being formed by a turned-back extension of the inner end of the second bow section and/or from the first bow section being manufactured from an elongated hollow section with a flat cross section, and in that the second bow section is manufactured from flat spring band material and or from the pre-stressed spring being formed by stamping of the widened end area of the second blow section.

By means of the fact that the hollow section of the first bow section is open on its underside in the area of its insertion end and/or the fact that the start of the open area of the underside of the hollow section is provided at approximately the height of the catch, an improvement of the adjustment possibilities has been attained in that on the one hand a larger range of adjustment can be attained and, on the other hand, in the course of activation of the respective bow section the disengagement of the respective parts of the stop device is also assured with certainty in the area of the outermost adjustment possibility.

The catch can be provided in a simple manner by a screw which can be inserted from the outside into a bore of the hollow section. However, in consideration of the appearance of the hollow section it is useful to provide that the catch is formed by a pin inserted from the outside into at least one bore of the hollow section, because in this way the catch remains essentially invisible.

It is attained in a simple manner by means of the that the clearance of the end area of the second bow section provided with the spring in its canted state with the spring pushed in is larger than the headroom between the catch and bottom area of the hollow section of the first bow section that it is not easily possible to disengage the two sections of the bow from each other after they have been pushed together and the catch has engaged, so that unintentional disengagement of the two bow sections during an adjustment operation is prevented.

BRIEF DESCRIPTION OF THE DRAWINGS

Further details of the invention can be seen from the following description, wherein the invention is described and explained in detail by means of the exemplary embodiment illustrated the drawings.

Shown are in:

FIG. 1 is a partially broken and longitudinally cut lateral view of a longitudinally adjustable bow in the locked position in accordance with a preferred embodiment of the instant invention, FIG. 2 is a section along the line II—II in FIG. 1, FIG. 3 is an illustration corresponding to FIG. 1, but in a position where the two bow sections are disengaged from each other, FIG. 4 is a section along the line IV—IV of FIG. 3, and FIG. 5 is an illustration corresponding to FIG. 1, but in a position of longitudinal adjustment of the two bow sections in respect to it.

DETAILED DESCRIPTION OF THE PREFERRED EMBODIMENT

The bow 10 of the glasses, illustrated in the drawings in accordance with a preferred embodiment of the instant invention, is adjustable in length and has for this purpose a first bow section 11 and a second bow section 12, which both are essentially made of metal and which have been inserted one into the other and are slidable with respect to each other. In the exemplary embodiment shown, the first bow section 11 will be connected with its end facing away from the second bow section 12 via a hinge, not shown, with the frame of a pair of glasses or with the lens of a pair of glasses. In contrast thereto, the second bow section 12 is provided with a curved bow end 13, generally made of plastic. By means of this it is possible by means of the longitudinally adjustable bow 10 to adjust the distance between the frame of the glasses or the lenses of the glasses and the bow end 13, disposed over the ear of the respective wearer, in accordance with the respective shape of the head of the wearer.

The first bow section 11 is essentially made of a hollow section 16 which, in accordance with FIG. 2, is elongated and rectangular in shape with a round upper and lower wall 17, 18, the hollow section 16 being very narrow. The hollow section 16 is closed over its entire circumference along a considerable portion of its length. Only in an area 19 facing the second bow section 12 is the hollow section 16 open on its underside in such a way, that by cutting it two parallel oblique surfaces 21 have been created on the downward facing longitudinal edges of the two sidewalls 22 and 23. The two oblique surfaces 21 cause the height of the hollow section 16 to dimish steadily towards the end facing the second bow section 12 to approximately three-quarters to two-thirds of its original height. In the vicinity of the upper wall 17, in approximately the longitudinal section in which the oblique surfaces 21 start, the two sidewalls 22, 23 of the hollow section 16 are provided with aligned bores 26, 27 into which a catch in the form of a pin 28 is inserted. This catch 28 is soldered into the two bores 26, 27 of the drawn hollow section 16.

It should be understood that it is also possible to use, instead of the pin 28, a screw, in the shape of a stud screw for example, which can be screwed in from the outside or the inside of the hollow section 16. In this case the bores 26, 27 can be in the form of an inside thread; however, it is also possible to use a sheet metal screw. Furthermore, it is then also possible to do away with one of the two bores 26, 27.

The second bow section 12 has a thin metallic strip 31, preferably of a flexible metal, which strip 31 is inserted and fixed in the plastic bow end 13 with its end 32 which is facing away from the first bow section 11. A first intermediate area 33 which is smooth, adjoins this outer end area 32 connected with the bow end 13, and a second intermediate area 34, which is provided on its upper edge 36 with a plurality of stop notches 37 disposed one behind the other, adjoins the first, and then adjoining it is a spring portion 38 forming the free insertion end, the flexible arm 39 of which is pre-stressed and endeavors to press the intermediate areas 33, 34 disposed inside the hollow section 16 against the inner surface 24 of the upper wall 17 of the hollow section 16. The stop notches 37 have an approximately semicircular shape, the radius of which is a little greater than that radius of the catch 28 which engages or comes to rest in one of the stop notches 37. It should be understood that it is also possible to make each one of the stop notches 37 a little deeper than what would correspond to the radius of the catch 28.

Each one of the areas 32, 33, 34, 38 of the metal strip 38 of the second bow section 12 may have the same length. The interior end area 38 is formed in such a way that its headroom, inclusive of the relaxed flexible arm 39, is larger than the interior headroom of the hollow section 16 between the inner surfaces 24, 25 of the upper or lower wall 17, 18, so that when the second bow section 12 is inserted into the first bow section 11, the flexible arm 39 is pre-stressed. The flexible arm 39 is to be considered, for example, as an extension of the strip 31 of the second bow section 12, bent back in respect to the inner end area 38. However, if the strip 31 of the second bow section 12 is made of a flexible metallic material, it is practical to produce the entire second bow section 12 as a stamped part, where in the course of stamping of the second bow section 12 from an appropriate metal band or metal strip the stop notches 37 as well as the shape of the interior flexible part 38, inclusive of the flexible arm 39, are stamped out.

The operation of the longitudinal adjustment of the bow 10 will now be described by means of FIGS. 3 and 5 in particular. As shown in FIG. 1, in particular the second intermediate area 34 with the stop notches 37 is bent under the action of the flexible arm 39 at the flexible part 38 in such a way towards the upper inner area 24 of the hollow section 16 of the first bow section 11, that one of the stop notches 37 receives the catch 28, so that a relative movement of the second box section 12 in relation to the first bow section 11 is no longer possible. This position of rest also remains when the glasses are worn, because the effect of the flexible part 38 is being assisted. If, while grasping the first bow section 11, pressure is applied to the second bow section 12 in the area of the bow end 13 in accordance with the arrow A, the second bow section 12 is being pivoted with respect to the first bow section 11 around the innermost end section of the upper edge 36 or around the point of rest 41 of the free end of the flexible arm 39 on the inner surface 25 of the lower wall 18 of the hollow section 16, so that the catch 28 is freed from the respective stop notch 37. This pivot movement is performed until the lower edge 42 of the second bow section 13 rests against the edge 43 of the hollow section 16 where the oblique surfaces 21 begin. The size of this pivot movement of the second bow section 12 in relation to the first bow section 11 is sufficient to displace the second bow section 12 now in relation to the first bow section 11 in the direction of the arrow B. For example, the length of the bow 10 is to be increased, namely by the value a. Once this has been accomplished, the second bow section 12 is released so that it now pivots upward in accordance with the arrow C around the point of rest 41', which has been moved because of the adjustment operation, which takes place automatically because of the effect of the flexible arm 39. In this position in FIG. 5 the catch 28 rests in another stop notch 37. In this state the flexible arm 39 again presses in particular the second intermediate area 34 of the bow section 12, which is supplied with stop notches 37, against the inner surface 24 of the upper wall 17 of the hollow section 16 of the first bow section 11.

In the exemplary embodiment shown, the edge 43 of the hollow section 16 is disposed approximately below the catch 28 and the free end of the flexible arm 39 extends approximately as far as that stop notch 37 which corresponds to the maximally adjustable length of the bow 10. Because the height of the flexible part 38 of the second bow section 12 between the underside of the free end of the flexible arm 39 and the upper edge 36 at the rear part of the flexible part 38 is greater in the canted or disengaged state in accordance with FIG. 3 than the headroom between the inner surface 25 of the lower wall 18 of the hollow section 16 and the underside of the catch 28, it is not possible to pull the second bow section 12 out of the first bow section 11 when the catch 28 is engaged.

What is claimed is:

1. A longitudinally adjustable bow for glasses, comprising:
    a first bow section formed as a closed hollow section, said first bow section having at least one catch which extends into the hollow section; and
    a second bow section slidably guided in the first bow section, said second bow section having a plurality of stop notches which face and engage said at least one catch, and a turned-back extension at its inner end forming a pre-stressed spring facing away from said at least one catch, against the force of which the second bow section can be moved relative to the first bow section for disengagement of the stop notches.

2. The longitudinally adjustable bow as defined in claim 1, wherein that portion of the second bow section having the plurality of stop notches and that portion having the turnedback extension are axially separated.

3. The longitudinally adjustable bow as defined in claim 2, wherein that portion of the second bow section having the plurality of stop notches and that portion having the turnedback extension are joined together.

4. The longitudinally adjustable bow as defined in claim 1, wherein the first bow section has a flat cross section, and the second bow section is made from flat spring band material.

5. The longitudinally adjustable bow as defined in claim 1, wherein the second bow section has a widened inner end, and wherein said pre-stressed spring is formed by stamping of the widened inner end.

6. The longitudinally adjustable bow defined in claim 1, wherein the first bow section defines an insertion end for the second bow section, and wherein said insertion end is open on its underside.

7. The longitudinally adjustable bow as defined in claim 6, wherein the opening of said insertion end starts at approximately the location of said at least one catch.

8. The longitudinally adjustable bow as defined in claim 1, wherein said hollow section has a pair of aligned bores, and wherein said at least one catch comprises a pin which extends through said aligned bores.

9. The longitudinally adjustable bow as defined in claim 1, wherein the turned-back extension is configured such that the clearance with the closed hollow section when the prestressed spring is canted and pushed in is greater than the headroom between said at least one catch and the bottom area of the closed hollow section.

* * * * *